United States Patent
Ruiz et al.

(10) Patent No.: US 10,891,435 B1
(45) Date of Patent: Jan. 12, 2021

(54) BOOTSTRAPPING MULTILINGUAL NATURAL LANGUAGE UNDERSTANDING VIA MACHINE TRANSLATION

(71) Applicant: Interactions LLC, Franklin, MA (US)

(72) Inventors: Nicholas Ruiz, Berkeley Heights, NJ (US); John Chen, Millburn, NJ (US); Srinivas Bangalore, Morristown, NJ (US)

(73) Assignee: INTERACTIONS LLC, Franklin, MA (US)

( * ) Notice: Subject to any disclaimer, the term of this patent is extended or adjusted under 35 U.S.C. 154(b) by 159 days.

(21) Appl. No.: 15/900,687

(22) Filed: Feb. 20, 2018

(51) Int. Cl.
*G06F 40/30* (2020.01)
*G06F 40/58* (2020.01)

(52) U.S. Cl.
CPC ............ *G06F 40/30* (2020.01); *G06F 40/58* (2020.01)

(58) Field of Classification Search
CPC ............ G06F 17/2785; G06F 17/289; G06F 17/2836; G06F 17/2854
See application file for complete search history.

(56) References Cited

U.S. PATENT DOCUMENTS

2018/0040020 A1\* 2/2018 Kurian .............. G06Q 30/0256
2018/0314689 A1\* 11/2018 Wang .................. G10L 15/1822

\* cited by examiner

*Primary Examiner* — Nafiz E Hoque
(74) *Attorney, Agent, or Firm* — Fenwick & West LLP

(57) ABSTRACT

Machine translation is used to leverage the semantic properties (e.g., intent) already known for one natural language for use in another natural language. In a first embodiment, the corpus of a first language is translated to each other language of interest using machine translation, and the corresponding semantic properties are transferred to the translated corpuses. Semantic models can then be generated from the translated corpuses and the transferred semantic properties. In a second embodiment, given a first language for which there is a semantic model, if a query is received in a second, different language lacking its own semantic model, machine translation is used to translate the query into the first language. Then, the semantic model for the first language is applied to the translated query, thereby obtaining the semantic properties for the query, even though no semantic model existed for the language in which the query was specified.

14 Claims, 5 Drawing Sheets

BOOTSTRAPPING MULTILINGUAL NATURAL LANGUAGE UNDERSTANDING VIA MACHINE TRANSLATION

FIELD OF ART

This disclosure relates to the field of natural language processing systems, and more particularly, to a natural language processing system that leverages existing knowledge about intent or other semantics in one language for use in another language.

BACKGROUND

Systems interacting with users, such as customer service systems, need to be able to intelligently respond to natural language input expressions of users, such as queries or commands. In order to provide intelligent responses, the system should be able to determine semantic properties of the user's natural language expressions, such as the intent of the expression (e.g., "Book a flight" or "Check weather"). One approach is to train a model that can be used to determine the semantic properties of input expressions, such as by applying supervised machine learning techniques to a corpus of known user input. However, training an effective model using supervised machine learning requires a significant amount of high-quality data, including both the user input and the corresponding values of the semantic property or properties of interest.

Unfortunately, obtaining the values of the semantic properties of interest can be difficult, requiring significant amounts of time on the part of multiple human experts, leading to considerable expense. This is particularly problematic when the system is intended to support a large number of different natural languages, since the semantic properties will need to be determined separately for each of the different languages, requiring large amounts of data and time for supervised training, leading to greatly increased effort and expense.

SUMMARY

Machine translation is used to leverage the semantic properties (e.g., intent) already known for one natural language for use in another natural language.

In a first embodiment, a semantic model (e.g., an intent model) is trained for each natural language to be supported. However, rather than separately obtaining semantic properties for a corpus of expressions in each language, the corpus (and corresponding known semantics) for a single first language can be leveraged via machine translation to produce semantic models for the other languages. Specifically, the corpus of the first language is translated to each other language of interest using machine translation, and the corresponding semantic properties are transferred to the translated corpuses. Semantic models can then be generated from the translated corpuses and the transferred semantic properties. When a user inputs a query or other expression in one of the other languages, the derived semantic model of the other language is then directly applied to the user expression to obtain the desired semantic properties.

In a second embodiment, machine translation is applied at the time of query processing, rather than pre-training semantic models for multiple different languages. Specifically, given a first language for which there is a semantic model, if a query is received in a second, different language lacking its own semantic model, machine translation is used to translate the query into the first language. Then, the semantic model for the first language is applied to the translated query, thereby obtaining the semantic properties for the query, even though no semantic model existed for the language in which the query was specified.

DETAILED DESCRIPTION

Figure 1:
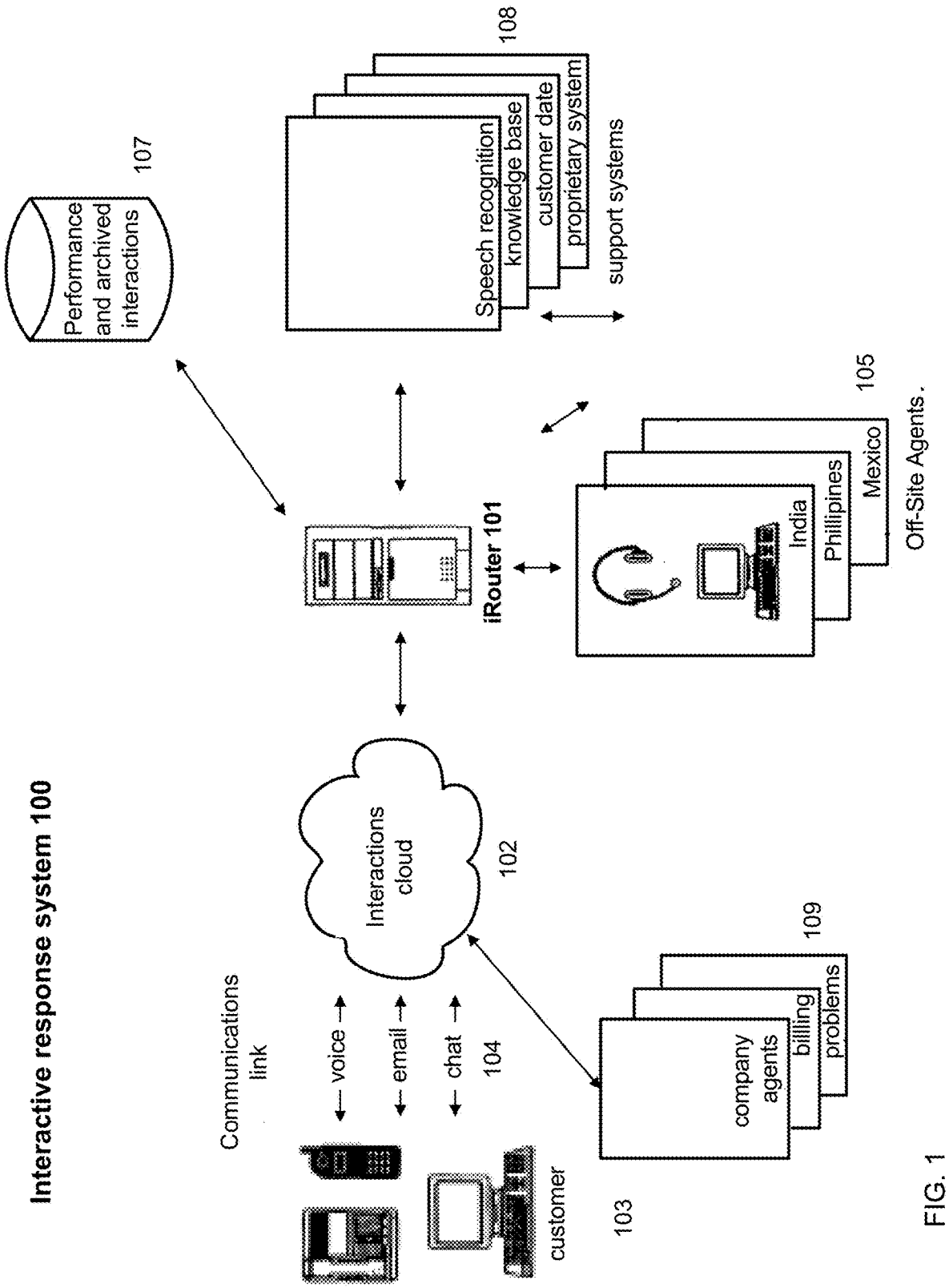
FIG. 1 illustrates one embodiment of an architecture for connecting an interactions cloud to an interactive response system through an interactive router.

FIG. 1 illustrates one embodiment of an architecture for connecting an interactions cloud 102 within an interactive response system 100 through an interactive router 101 (herein referred to as an "iRouter"). As shown in FIG. 1, interactions cloud 102 is connected to a customer 103 through communications link 104. Interactions cloud 102 is also connected to support systems 106 and off-site agents 105 at iRouter 101 via a datalink, which comprises a TCP/IP data link in this example embodiment. Interactions cloud 102 in this example embodiment comprises a computer server. The exact configuration of the computer server varies with the implementation but typically runs an operating system such as Windows™ or Linux™ connecting digitally or using a media gateway server from a vendor such as Dialogic™ Interactions cloud 102 can also be an e-mail gateway or web server. Thus, customer input enters interactive response system 100 via telephone or intercom and text is entered via email or an interactive chatting interface (e.g., a web page or a stand-alone application such as Yahoo™ Messenger).

In this architecture of FIG. 1, in various embodiments a number of different types of devices are used to implement each of the interactions cloud 102 and communications links 104. Interactions cloud 102 may be implemented by any device capable of communicating with the customer 103. For example, interactions cloud 102 is in one embodiment a telephony server in interactive response system 100 where the customer is calling by telephone. The telephony server handles answering, transferring and disconnecting incoming calls. The telephony server is also a storehouse for prerecorded audio clips so that it can play any welcome prompt or other audio clips as directed by iRouter 101.

A telephony server in accordance with this embodiment is assembled from off-the-shelf components, for example Windows for an operating system, a central processing unit, and a Dialogic™ media gateway server. Using this architecture, the communications link 104 is implemented by any means of providing an interface between the customer's telephone and the telephony server. For example, communications link 104 is in various embodiments a dial-up connection or a two-way wireless communication link.

In another exemplary embodiment, interactions cloud 102 is a gateway server in interactive response system 100. In accordance with this exemplary embodiment, the customer interacts with the interactive response server by e-mail, interactive text chats or VOIP. The gateway server runs customized open source e-mail, www server software or SIP. Further, a gateway server in accordance with this exemplary embodiment is designed to conduct e-mail, interactive text chat, or VOIP transactions with customers, while also forwarding and receiving data to other elements of the system. Using this architecture, the communications link 104 is implemented by any means of providing an interface between the customer's computer and the gateway server. For example, communications link 104 is in various embodiments a dedicated interface, a single network, a combination of networks, a dial-up connection or a cable modem.

While only one interactions cloud 102 is illustrated in FIG. 1, one skilled in the art will appreciate that multiple interactions clouds 102 may be used in this system after studying this specification. With multiple interactions clouds 102, an interactive response system may communicate via voice and text data with a customer. Further, multiple customer bases may be accommodated by a dedicated interactions cloud 102 for each of the customer bases.

Figure 2:
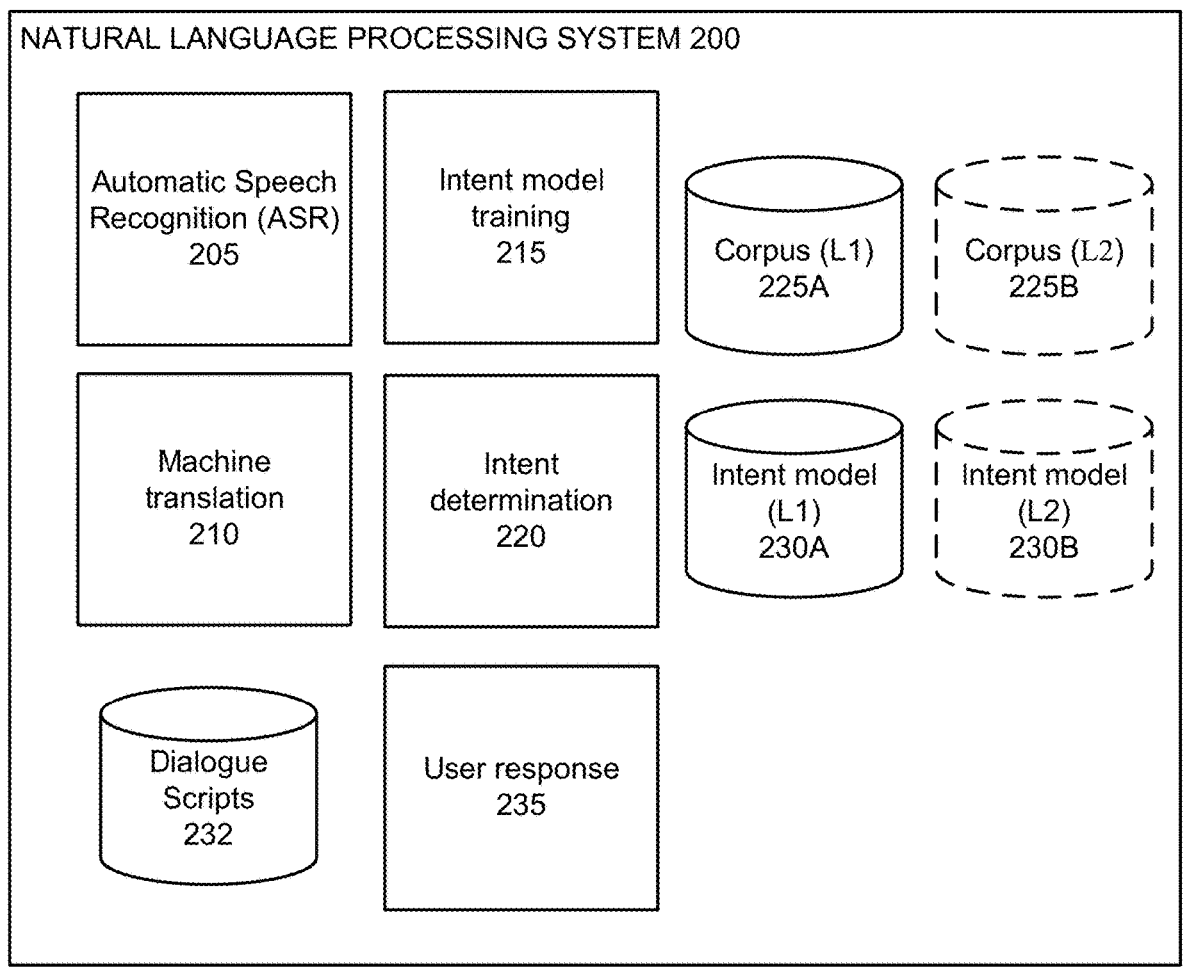
FIG. 2 illustrates in more detail the components of a natural language processing system, according to some embodiments.

In the architecture of FIG. 1, the iRouter 101 comprises software to control interactive response system 100. iRouter 101 "owns" the interaction with customer 103 from beginning to end by coordinating activity among other components and managing the transaction.

iRouter 101 receives interaction input (including user expressions) from interactions cloud 102 in the form of audio clips, email, text data or other interaction type—depending on the form of customer communication—and forwards the input to one or more human agents 105 (sometimes referred to as "Intent Analysts" or "IAs"), speech recognition engines or expert systems (collectively 108, and sometimes referred to as "automated speech recognizers" or "ASRs") and uses the responses to advance its current workflow (as discussed below with respect to the dialogue scripts 232 of FIG. 2). When human interpretation (or translation) of the input is necessary, iRouter 101 directs human agent desktop software to display an appropriate visual context of the current workflow. Once iRouter 101 understands the input, iRouter 101 advances through the workflow and directs interactions cloud 102 to respond appropriately to customer 103.

In an example embodiment in which interactions cloud 102 comprises a telephony server, iRouter 101 delivers sound clips to play back to a customer, sends text-to-speech clips, or both. Alternatively, interactions cloud 102 may store sound clips, have text-to-speech capability or both. In this embodiment, iRouter directs interactions cloud 102 as to what to play to a customer and when.

In some embodiments, interactive response system 100 includes at least one pool of human agents 105. A pool of human agents 105 is often located at a contact center site. In some embodiments, human agents 105 use specialized desktop software specific to system 100 that presents a collection of possible intents on their screen (their user interface)—along with a history or context of the customer interaction to that point. The human agent or agents 105 interpret the input and select an appropriate customer intent, data or both.

Performance and interactions archive 107 comprises a database that can be maintained on any common computer server hardware. Performance and interactions archive 107 contains both archival data of system transactions with customers 103 (i.e., a repository of sound clips, e-mails, chats, etc. from interactions with customer 103) as well as performance data for human agents 105.

This example embodiment employs "reporter" software to generate statistics about a group of interactions or to display performance ranking for human agent 105. Reporter software can also reconstruct an interaction with customer 103 from sound clips, e-mails, or chat text that constituted customer's 103 contact stored in interactions archive 107. Reporter software is a series of scripts, and can run on any common server hardware.

This example embodiment also includes manager/administrator software, usually run from the same station as reporter software. Manager/administrator software sets operating parameters for interactive response system 100. Such operating parameters include, but are not limited to, business rules for load balancing, uploading changes in workflow, and other administrative changes. In one particular embodiment, manager/administrator software is a small custom Java application running on a standard call center computer workstation.

Support system 108 consists of numerous databases and customer proprietary systems (in some embodiments including off-the-shelf automated speech recognition (ASR) software such as Interactions Curo™) that may be employed in responding to customer 103 requests. For example, support system 108 may include a database for customer information or a knowledge base. Support system 108 may also include a text-to-speech capability that reads text to customer 103.

Company agents 109 consist of human agents that handle customer 103 requests that the workflow refers to them. For example, should customer 103 intend to obtain assistance with a company matter, and an outsourced human agent 105 identifies that intent, the workflow may direct interactive response system 100 to transfer the call to company agent 109.

The elements of interactive response system 100 communicate over a TCP/IP network in this exemplary embodiment. Communication is driven by the workflow that iRouter 101 follows. "Database" in the present embodiment can be a flat file database, a relational database, an object database, or some combination thereof.

FIG. 2 illustrates in more detail the components of a natural language processing system 200, which is a component of a system such as the iRouter 101 of FIG. 1, according to some embodiments. The natural language processing system 200 responds to a query or other expression from users (e.g., customers 103) and makes an appropriate response.

In some embodiments, the natural language processing system 200 includes a set of dialogue scripts 232 that allow the natural language processing system to respond appropriately to a sequence of customer expressions, thereby implementing a workflow. In one embodiment, the dialogue scripts are implemented as a set of states of a dialogue with a user, where the dialogue transitions from one state to another (or perhaps remains at the same state) based upon the last user expression, such as a determined intent of the last expression. The dialogue scripts can be used, for example, to respond to a customer's requests, such as a sequence of customer requests in the airline industry domain to accomplish complex actions such as purchasing an airline ticket.

For example, in an embodiment in which the dialogue scripts 232 include scripts representing a dialogue taking place about the airline industry domain, an initial state of the dialogue could represent the state of the dialogue, at which point nothing is yet known about the user's desires. Subsequent states of the dialogue could respectively correspond to the user's desire to check the status of a particular flight, to book a flight, and to cancel a flight. In turn, the state corresponding to the user's desire to book a flight could lead to other states in which additional information about the properties of the flight are elicited.

In one embodiment, the dialogue scripts 232 take an action (e.g., providing an audio or textual prompt to the user indicating information to be elicited from the user appropriate for a given state) and transition between states based upon an intent determined from the user's expressions. Continuing the airline industry example, starting from the initial state, if the user provides the expression "I want to buy a plane ticket"—such as by speaking the expression, or by typing the expression into a chat-based user interface—the intent of the expression is determined to be to book a flight, causing the natural language processing system 200 to provide a prompt to the user (e.g., "Where would you like to go to?") and to transition to an appropriate state (such as a state in which a destination of a flight is to be provided).

In some embodiments, the natural language processing system 200 includes an automatic speech recognition (ASR) module 205 that converts an audio expression spoken by a user into an equivalent textual expression that can be better processed by other modules of the system than its raw audio equivalent.

The natural language processing system 200 includes a corpus 225A that stores a plurality of expressions in a first natural language $L_1$, such as English. (For simplicity, "natural language" will be referred to hereafter simply as "language".) The expressions of the corpus 225A represent queries, commands, or other expressions that users can make when interacting with the system 100, and the expressions have corresponding intents that represent a goal of the user when giving the expression. For example, an expression "I want to buy a plane ticket" might have the corresponding intent "Book flight" within the corpus 225A, and the expression "What's the status of flight 603A?" might have the corresponding intent "Check flight status." The intent may be represented in different embodiments by various types of data, such as integers, strings, or the like.

The natural language processing system 200 includes an intent model 230A for the first language, $L_1$. The intent model 230A is data that, when applied to a user expression, produces one or more intents associated with the expression. In some embodiments, the application of the intent model 230A results in a plurality of intents, one for each possible intent tracked by the natural language processing system 200, along with a confidence score for each. For example, for the expression "I want to buy a plane ticket", application of the intent model 230A might produce a very high confidence score for the intent "Book flight", with very low confidence scores for the other possible intents. For an expression such as "Paris to Tokyo", application of the intent model might produce a moderate confidence score for both the intent "Book flight" and the intent "Check flight status", since the expression is somewhat ambiguous with respect to the precise action to be taken for the flight from Paris to Tokyo.

In some embodiments—such as the embodiment described in FIG. 3A, below—the natural language processing system 200 further includes a corpus 225B and an intent model 230B, similar to the corpus 225A and intent model 230A, but for a second language $L_2$ different from the language $L_1$. For example, $L_1$ might be English, and $L_2$ Spanish.

The natural language processing system 200 includes a machine translation module 210 that translates an expression in a first language to an semantically-equivalent expression in a second language (e.g., the English expression "I want to buy a plane ticket" to the Spanish expression "Quiero comprar un boleto de avión"). The machine translation module 210 may support translations between multiple languages. In one embodiment, the machine translation module 210 uses neural machine translation based on an encoder-decoder architecture.

In some embodiments, the natural language processing system 200 includes an intent model training module 215 that generates intent models (e.g., 230A and 230B) for the various languages supported by the system. The intent model training module 215 takes as input a corpus 225 for a given language, where the corpus includes both expressions in that language and corresponding intents for the expressions. The intents may have been determined manually, such as by human experts (e.g., the off-site agents 105 of FIG. 1), or automatically (such as through machine translation equivalences, as described below with respect to FIG. 3A). The intent model training module 215 applies a supervised machine learning algorithm, such as, to the corpus 225, generating a corresponding intent model 230.

The natural language processing system 200 includes an intent determination module 220 that determines a user intent for a given user expression. The intent determination module 220 selects the intent model 230 that corresponds to the language of the user expression (e.g., an English intent model 230 if the user expression is in English). The intent determination module 220 can determine the language of the user expression in various ways, such as by examining a location of the computing device of the user, by applying the ASR module 205 or using other audio analysis techniques, or some combination thereof. The intent determination module 220 applies the appropriate intent model 230, and selects the intent having the greatest confidence score as the intent represented by the expression. In some embodiments, the confidence score corresponding to the selected intent is returned along with the intent itself (e.g., <"Book flight", 0.6>, indicating a confidence score of 0.6 for the "Book flight" intent).

The natural language processing system 200 includes a user response module 235 that takes as input an expression of a user—such as an utterance expressed in audio, or text input into a chat user interface or other textual user interface—and responds to the user in an appropriate manner.

The user response module 235 converts the expression to a form expected by the intent determination module 220. For example, if the intent determination module 220 expects an expression in textual form, and the expression is given in spoken audio form, the intent determination module converts the audio form to a textual form using the ASR module 205.

The user response module 235 identifies a language of the expression, e.g., using the techniques described above with respect to the intent determination module 220.

The user response module 235 applies an intent model 230 to obtain the intent of the expression. The intent model 230 that is applied, and the form of the expression to which it is applied, vary in different embodiments. FIG. 3A and FIG. 3B below describe two different embodiments, with action 315 of FIG. 3A, and actions 355 and 360 of FIG. 3B, representing the actions taken by the user response module 235 at query time.

With an intent determined, in one embodiment the user response module 235 uses the intent to select an appropriate action and transition between states of the dialogue scripts. For example, if the user response module 235 determines that the user expression "Quiero comprar un boleto de avión" represents a "Book flight" intent, the user response module could cause a transition from the initial state of the dialogue scripts to a state indicating that the uses wishes to book a flight and that more information about the flight is required.

In one embodiment, if a confidence score provided along with the determined intent is less than some minimum confidence threshold, the user response module 235 sends the user's expression to a human agent, such as the off-site agents 105 of FIG. 1, who can provide a high-accuracy intent for the expression. The intent provided by the human agents can then be used by the intent model training 215 to train more accurate intent models 230.

Figure 3A:
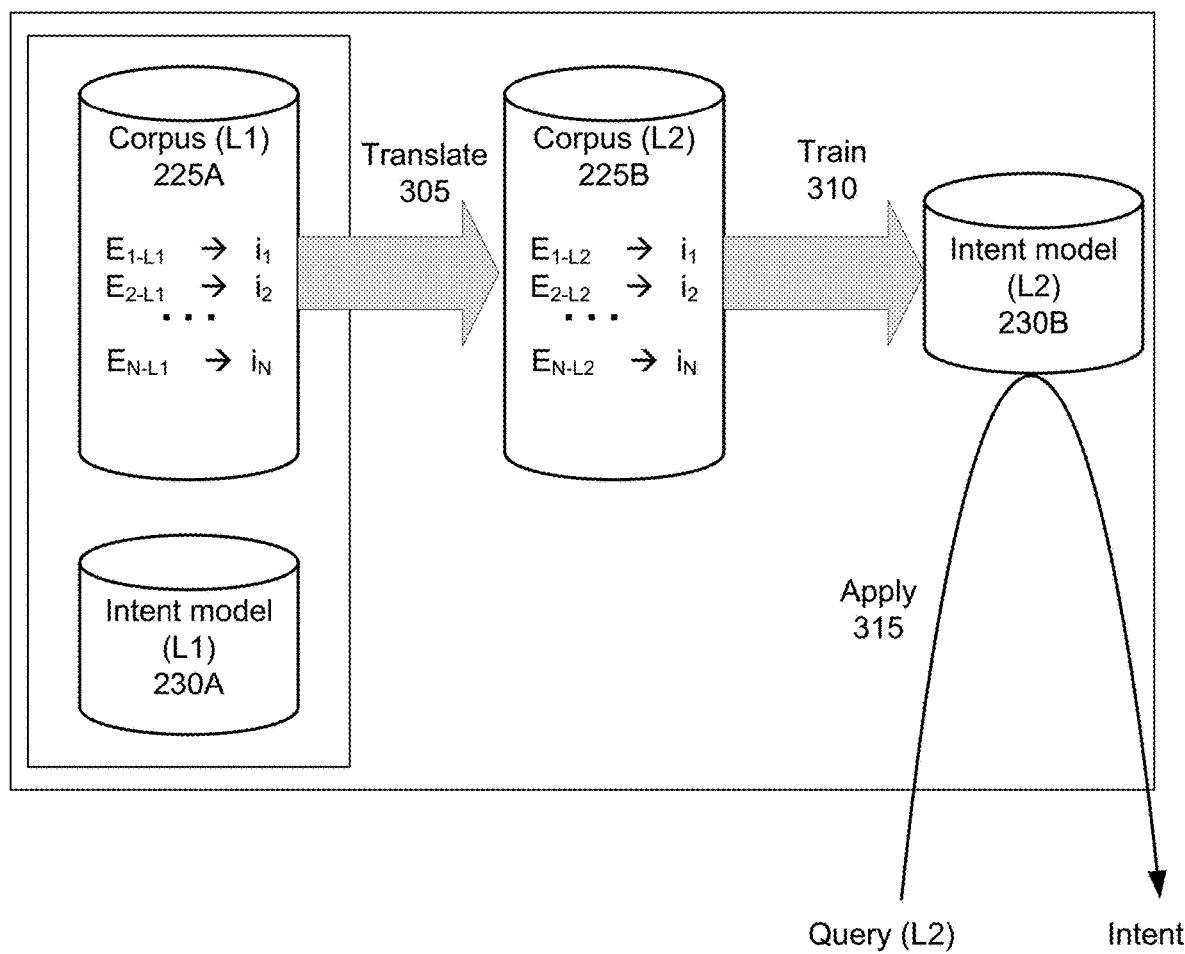
FIG. 3A illustrates an embodiment in which machine translation is used to train an intent model for each language that will be supported by the natural language processing system.
Figure 3B:
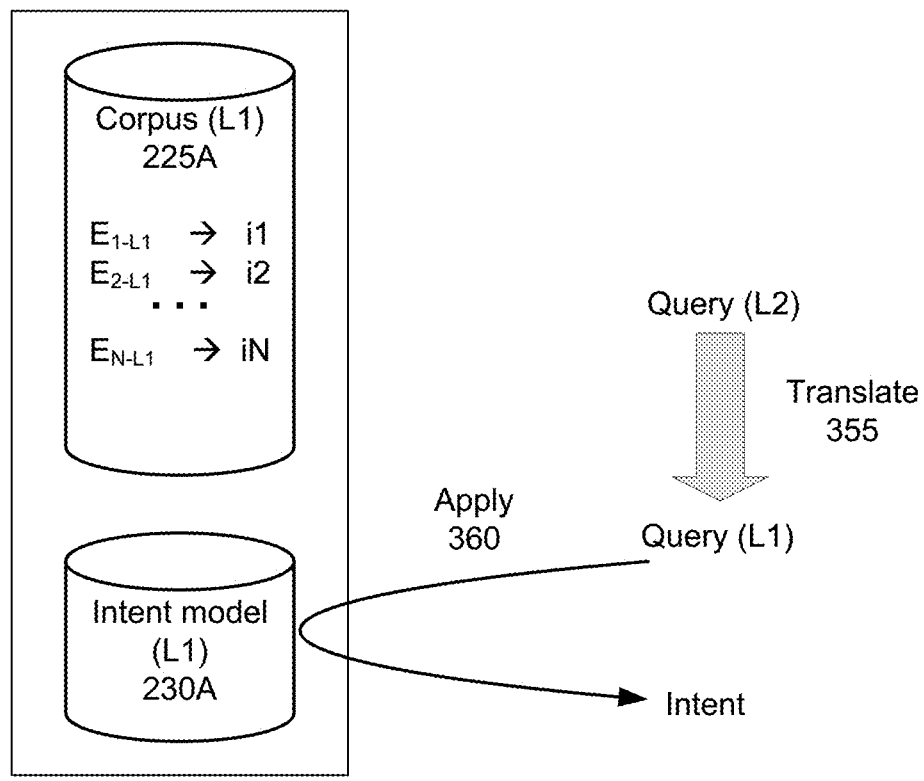
FIG. 3B illustrates a different embodiment in which machine translation is employed dynamically at the time of responding to a user query or other expression.

FIG. 3A illustrates an embodiment in which machine translation is used to train an intent model 230 for each language that will be supported by the natural language processing system 200. Initially, the natural language processing system 200 includes a corpus 225A for a first language (e.g., English), and the corpus 225A has a corresponding set of intents for the expressions in the corpus. For example, these intents could have been determined through manual labeling by human experts (such as the agents 105 of FIG. 1). However, such manual labeling is time-consuming and labor-intensive, and therefore expensive. Thus, it may be difficult to obtain a sufficiently large set of high-quality intents for a corpus 225B for a second language (e.g., Spanish), in addition to the intents known for the corpus 225A. This problem of obtaining intent labels grows dramatically the more languages the system 100 should support.

Thus, rather than obtaining independent intent data for the expressions of the second intent model 230B (e.g., Spanish expressions), machine translation is instead employed to leverage the intents already known for the first language. Specifically, the machine translation module 210 is used to translate 305 the corpus 225A to an equivalent corpus 225B for the second language by translating each of the expressions of the corpus 225A into a semantically-equivalent expression in the second language (e.g., the expression $E_{1-L1}$ (the first expression in the first language, $L_1$) to expression $E_{1-L2}$, the first expression in the second language, $L_2$). The intents corresponding to an expressions of the first corpus 225A are transferred to the machine translated equivalents of the second corpus, given that since the translations are semantically-equivalent, the intents will also be equivalent, regardless of the language. (Thus, in FIG. 1, both the expression $E_{1-L1}$, and its translated equivalent $E_{1-L2}$, have the same intent, ii.) For example, the if the first corpus 225A contains the expression "I want to buy a plane ticket", which has a known intent "Book ticket", then the "Book ticket" intent is also associated with the machine translated equivalent, "Quiero comprar un boleto de avión", in the second corpus 225B. The intent model training module 215 is in turn used to train 310 an intent model 230B for the second language, given the generated second corpus 22B with its corresponding intents.

With the intent model 230B constructed for the second language, the user response module 235 can be applied to handle user queries or other expressions given in the second language. That is, the intent determination module 220 applies 315 the intent model 230 that corresponds to the language of an expression (e.g., the second intent model 230B for an expression in the second language), obtaining a most probable intent for the expression.

Thus, for example, if the Spanish expression "¿Cuándo llega el avión de Madrid?" were received, an intent (e.g., "Check flight status") could be directly determined based on the intent model 230 for the Spanish language, even if originally only an English intent model had been available.

FIG. 3B illustrates a different embodiment in which machine translation is employed dynamically at the time of responding to a user query or other expression, rather than as part of a preprocessing stage that generates intent models 230, as in FIG. 3A. Specifically, when the user response module 235 receives a query or other expression from a user in a language for which the natural language processing system 200 does not include an intent model 230 (denoted $L_2$ in FIG. 3B), the user response module first translates 355 the query expression using the machine translation module 210 from that language to a language for which the natural language processing system 200 does already include an intent model 230 (denoted $L_1$ in FIG. 3B). The intent determination module 220 then applies 360 the intent model for that language ($L_1$) to the translated query expression to obtain a most probable intent for the expression.

Thus, for example, if the Spanish expression "¿Cuándo llega el avión de Madrid?" were received, an intent (e.g., "Check flight status") could be indirectly determined by first using machine translation to generate the English equivalent expression "When does the plane from Madrid arrive?", then applying the intent model 230 for the English language, even if an intent model for the Spanish language were not available.

The embodiments of FIGS. 3A and 3B have different advantages. For example, the generation of separate intent models 230 for each language at preprocessing time, as in FIG. 3A, has runtime speed advantages, since machine translation has already been performed and thus need not be performed when the query is being processed. The use of machine translation at runtime, as in FIG. 3B, however, has the advantage of lesser storage requirements, since additional intent models need not be stored, as well as lessening the need for human agents capable of understanding the second language.

Although intent is the semantic property discussed in the description above, other semantic properties can be determined in other embodiments. For example, instead of or in addition to training intent models 230, other semantic models can be trained to extract semantic properties such as sentiment, or action and object, from a user expression.

Figure 4:
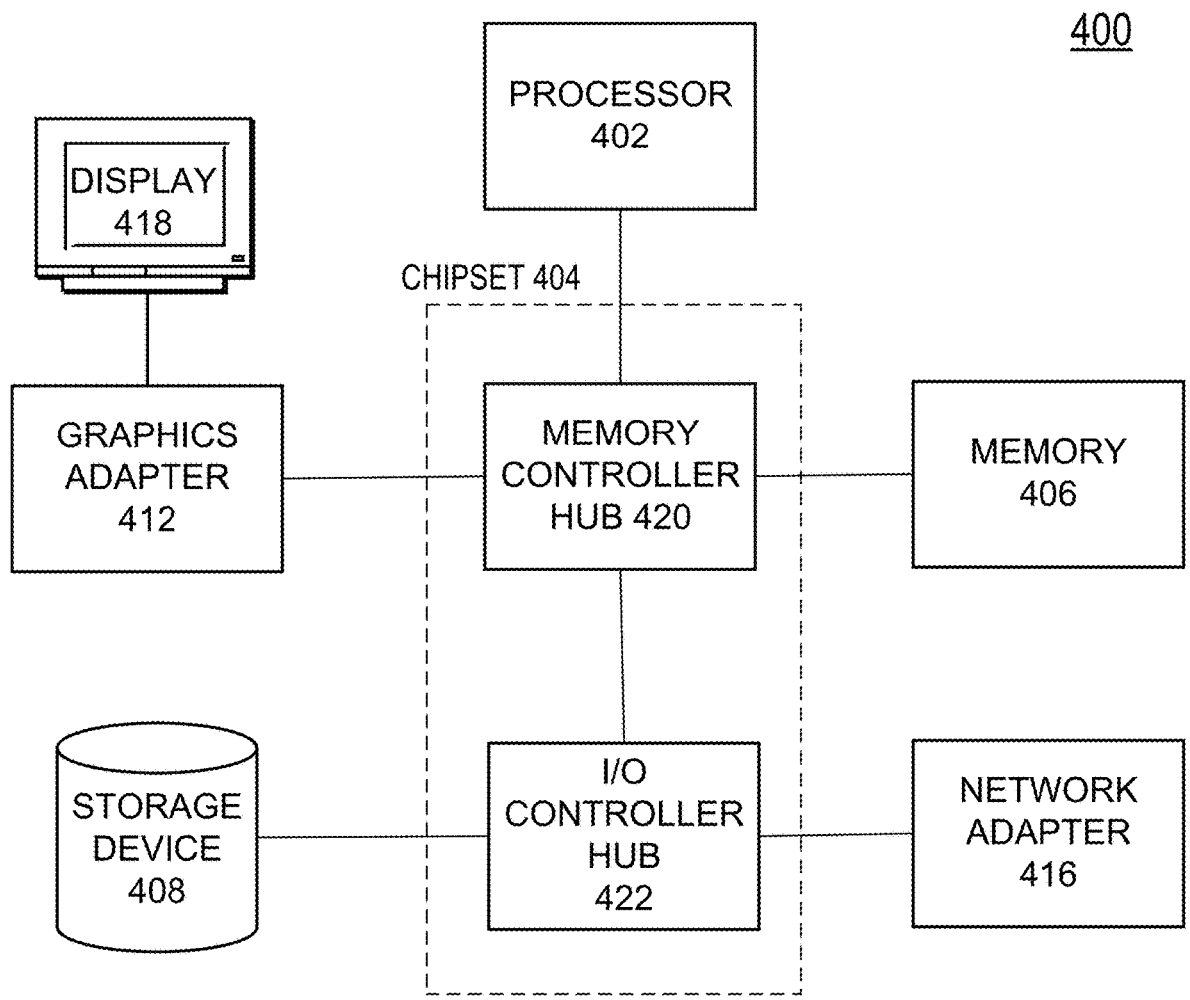
FIG. 4 is a high-level block diagram illustrating physical components of a computer used as part or all of the computing environment from FIG. 1, according to one embodiment.

FIG. 4 is a high-level block diagram illustrating physical components of a computer 400 used as part or all of the computing environment from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present disclosure has described in particular detail one possible embodiment. Those of skill in the art will appreciate that other embodiments may also be employed. First, the particular naming of the components and variables, capitalization of terms, the attributes, data structures, or any other programming or structural aspect is not mandatory or significant, and the mechanisms that implement the described embodiment or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the described embodiments in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described embodiments include process steps and instructions described herein in the form of an algorithm. It should be noted that the process steps and instructions of the described embodiments could be embodied in software, firmware or hardware, and when embodied in software, could be downloaded to reside on and be operated from different platforms used by real time network operating systems.

The described embodiments also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the described embodiments are not described with reference to any particular programming language. It is appreciated that a variety of programming languages may be used to implement the teachings of the described embodiments, and any references to specific languages are provided for enablement and best mode.

The described embodiments are well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the described embodiments are intended to be illustrative, but not limiting, of the scope of the invention, which is set forth in the following claims.

What is claimed is:

1. A computer-implemented method comprising:
    accessing a corpus comprising a plurality of expressions in a first natural language, each of the expressions having a corresponding intent label;
    generating, for a second natural language, a translated corpus comprising, for each expression in the corpus, a translation of the expression into the second natural language;
    associating, for each expression, the intent label associated with the expression with the translation of the expression into the second natural language;
    generating an intent model for the second natural language from the translated expressions and the intent labels using a machine learning algorithm;

receiving a user expression from a user;
determining that the user expression is in the second natural language;
using the generated intent model for the second natural language to obtain an intent label for the user expression;
transitioning from a current state to a next state of a workflow for a telephonic conversation with the user, based on the intent label for the user expression; and
providing a prompt to the user to elicit information for the next state.

2. The computer-implemented method of claim 1, further comprising:
determining that a confidence score associated with the intent label is below a minimum confidence threshold;
responsive to the determination, providing the expression to a human agent different from the user.

3. The computer-implemented method of claim 2, further comprising:
receiving an intent label for the user expression from the human agent; and
regenerating the intent model for the second natural language using the intent label received from the human agent.

4. A computer-implemented method comprising:
accessing a corpus comprising a plurality of expressions in a first natural language, each of the expressions having a corresponding semantic label;
receiving, from a user, a user expression in a second natural language;
translating the user expression to an equivalent expression in the first natural language;
obtaining, for the user expression in the second natural language, a semantic label by applying a semantic model for the first natural language to the translated equivalent expression;
transitioning from a current state to a next state of a workflow for a conversation with the user, based on the semantic label for the user expression; and
providing a prompt to the user to elicit information for the next state.

5. The computer-implemented method of claim 4, further comprising:
determining that a confidence score associated with the semantic label is below a minimum confidence threshold;
responsive to the determination, providing the expression to a human agent.

6. A computer-implemented method comprising:
accessing a corpus comprising a plurality of expressions in a first natural language, each of the expressions having a corresponding intent label;
generating, for a second natural language, a translated corpus comprising, for each expression in the corpus, a translation of the expression into the second natural language;
associating, for each expression, the intent label associated with the expression with the translation of the expression into the second natural language;
generating an intent model for the second natural language from the translated expressions and the intent labels using a machine learning algorithm;
receiving a user expression from a user;
determining that the user expression is in the second natural language;
using the generated intent model for the second natural language to obtain an intent label for the user expression;
determining that a confidence score associated with the intent label is below a minimum confidence threshold; and
responsive to the determination, providing the user expression to a human agent different from the user.

7. The computer-implemented method of claim 6, further comprising:
receiving an intent label for the user expression from the human agent; and
regenerating the intent model for the second natural language using the intent label received from the human agent.

8. A computer-implemented method comprising:
accessing a corpus comprising a plurality of expressions in a first natural language, each of the expressions having a corresponding semantic label;
generating, for a second natural language, a translated corpus comprising, for each expression in the corpus, a translation of the expression into the second natural language;
associating, for each expression, the semantic label associated with the expression with the translation of the expression into the second natural language;
generating a semantic model for the second natural language from the translated expressions and the semantic labels using a machine learning algorithm;
receiving a user expression from a user;
determining that the user expression is in the second natural language;
using the generated semantic model for the second natural language to obtain a semantic label for the expression;
transitioning from a current state to a next state of a workflow for a conversation with the user, based on the semantic label for the expression; and
providing a prompt to the user to elicit information for the next state,
wherein the conversation with the user is via textual messages.

9. A computer-implemented method comprising:
accessing a corpus comprising a plurality of expressions in a first natural language, each of the expressions having a corresponding semantic label;
receiving an expression in a second natural language;
translating the expression to an equivalent expression in the first natural language;
obtaining, for the user expression in the second natural language, a semantic label by applying a semantic model for the first natural language to the translated equivalent expression;
determining that a confidence score associated with the semantic label is below a minimum confidence threshold; and
responsive to the determination, providing the expression to a human agent.

10. A computer system comprising:
a computer processor; and
a non-transitory compute-readable storage medium storing instructions that when executed by the computer processor perform actions comprising:
accessing a corpus comprising a plurality of expressions in a first natural language, each of the expressions having a corresponding intent label;

generating, for a second natural language, a translated corpus comprising, for each expression in the corpus, a translation of the expression into the second natural language;

associating, for each expression, the intent label associated with the expression with the translation of the expression into the second natural language;

generating an intent model for the second natural language from the translated expressions and the intent labels using a machine learning algorithm;

receiving an expression from a user;

determining that the expression is in the second natural language;

using the generated intent model for the second natural language to obtain an intent label for the expression;

transitioning from a current state to a next state of a workflow for a telephonic conversation with the user, based on the intent label for the expression; and providing a prompt to the user to elicit information for the next state.

11. A computer system comprising:

a computer processor; and a non-transitory compute-readable storage medium storing instructions that when executed by the computer processor perform actions comprising:

accessing a corpus comprising a plurality of expressions in a first natural language, each of the expressions having a corresponding intent label;

generating, for a second natural language, a translated corpus comprising, for each expression in the corpus, a translation of the expression into the second natural language;

associating, for each expression, the intent label associated with the expression with the translation of the expression into the second natural language;

generating an intent model for the second natural language from the translated expressions and the intent labels using a machine learning algorithm receiving an expression from a user;

determining that the expression is in the second natural language;

using the generated intent model for the second natural language to obtain an intent label for the expression;

determining that a confidence score associated with the intent label is below a minimum confidence threshold; and responsive to the determination, providing the expression to a human agent different from the user.

12. A computer system comprising:

a computer processor; and a non-transitory compute-readable storage medium storing instructions that when executed by the computer processor perform actions comprising:

accessing a corpus comprising a plurality of expressions in a first natural language, each of the expressions having a corresponding intent label;

generating, for a second natural language, a translated corpus comprising, for each expression in the corpus, a translation of the expression into the second natural language;

associating, for each expression, the intent label associated with the expression with the translation of the expression into the second natural language;

generating an intent model for the second natural language from the translated expressions and the intent labels using a machine learning algorithm;

receiving an expression from a user;

determining that the expression is in the second natural language;

using the generated intent model for the second natural language to obtain an intent label for the expression;

transitioning from a current state to a next state of a workflow for a conversation with the user, based on the intent label for the expression; and providing a prompt to the user to elicit information for the next state, wherein the conversation with the user is via textual messages.

13. A computer system comprising:

a computer processor; and a non-transitory computer-readable storage medium storing instructions that when executed by the computer processor perform actions comprising:

accessing a corpus comprising a plurality of expressions in a first natural language, each of the expressions having a corresponding semantic label;

receiving, from a user, an expression in a second natural language;

translating the expression to an equivalent expression in the first natural language;

obtaining, for the user expression in the second natural language, a semantic label by applying a semantic model for the first natural language to the translated equivalent expression;

transitioning from a current state to a next state of a workflow for a conversation with the user, based on the semantic label for the expression; and providing a prompt to the user to elicit information for the next state.

14. A computer system comprising:

a computer processor; and a non-transitory compute-readable storage medium storing instructions that when executed by the computer processor perform actions comprising:

accessing a corpus comprising a plurality of expressions in a first natural language, each of the expressions having a corresponding semantic label;

receiving an expression in a second natural language;

translating the expression to an equivalent expression in the first natural language;

obtaining, for the user expression in the second natural language, a semantic label by applying a semantic model for the first natural language to the translated equivalent expression;

determining that a confidence score associated with the semantic label is below a minimum confidence threshold; and responsive to the determination, providing the expression to a human agent.

* * * * *